(12) United States Patent
Folkvang

(10) Patent No.: US 9,950,281 B2
(45) Date of Patent: Apr. 24, 2018

(54) APPARATUS AND METHOD FOR SEPARATION OF HYDROCARBONS FROM HYDROCARBON-CONTAINING PRODUCED WATER

(71) Applicant: Cameron International Corporation, Houston, TX (US)

(72) Inventor: Jorn Folkvang, Stathelle (NO)

(73) Assignee: Cameron International Corporation, Houston, TX (US)

( * ) Notice: Subject to any disclaimer, the term of this patent is extended or adjusted under 35 U.S.C. 154(b) by 824 days.

(21) Appl. No.: 14/360,551

(22) PCT Filed: Nov. 28, 2012

(86) PCT No.: PCT/US2012/066820
§ 371 (c)(1),
(2) Date: May 23, 2014

(87) PCT Pub. No.: WO2013/109345
PCT Pub. Date: Jul. 25, 2013

(65) Prior Publication Data
US 2014/0346118 A1 Nov. 27, 2014

(30) Foreign Application Priority Data
Jan. 19, 2012 (NO) .................................. 20120060

(51) Int. Cl.
| | | |
|---|---|---|
| *C02F 1/24* | (2006.01) | |
| *B01D 17/02* | (2006.01) | |
| *B01D 45/16* | (2006.01) | |
| *B03D 1/02* | (2006.01) | |
| *B03D 1/14* | (2006.01) | |
| *B03D 1/24* | (2006.01) | |

(Continued)

(52) U.S. Cl.
CPC ......... *B01D 17/02* (2013.01); *B01D 17/0205* (2013.01); *B01D 45/16* (2013.01);
(Continued)

(58) Field of Classification Search
None
See application file for complete search history.

(56) References Cited

U.S. PATENT DOCUMENTS

| | | |
|---|---|---|
| 2010/0180768 A1 | 7/2010 | Folkvang |
| 2011/0290738 A1 | 12/2011 | Folkvang |
| 2015/0076083 A1* | 3/2015 | Folkvang ........... B01D 17/0205 210/767 |

FOREIGN PATENT DOCUMENTS

| | | |
|---|---|---|
| DE | 23 48 844 A1 | 4/1975 |
| EP | 1 091 041 A1 | 4/2001 |

(Continued)

OTHER PUBLICATIONS

Extended European Search Report Issued in Corresponding EP Application No. 12865978.6, dated Aug. 6, 2015 (6 Pages).
(Continued)

*Primary Examiner* — Thomas M Lithgow
(74) *Attorney, Agent, or Firm* — Chamberlain Hrdlicka

(57) ABSTRACT

The present invention relates to an apparatus for separation of hydrocarbons from hydrocarbon-containing produced water, comprising; a separator tank, at least one inlet tube (22, 27), at least one branch means (6) distributing the produced water stream, at least one outlet nozzle (7) and at least one guide vane (8.1) mounted under each outlet nozzle and leading water over the next outlet nozzle; at least one outlet (12) in the bottom of the tank for cleaned water and at least one outlet (9, 35, 36) rejecting rising gas with adherent oil droplets, at least one shroud (39) is arranged entirely or partly along the inside of at least one guide vane (8.1) in an angle of 30° to 150° related to the at least one guide vane (8.1). Further the invention relates to a process for separation of hydrocarbons from hydrocarbon-containing produced water.

17 Claims, 4 Drawing Sheets

(51) Int. Cl.
*C02F 1/40* (2006.01)
*C02F 1/20* (2006.01)
*C02F 1/30* (2006.01)
*C02F 1/38* (2006.01)
*C02F 101/32* (2006.01)
*C02F 103/36* (2006.01)
*C02F 103/10* (2006.01)

(52) U.S. Cl.
CPC ........... *B03D 1/028* (2013.01); *B03D 1/1412* (2013.01); *B03D 1/1475* (2013.01); *B03D 1/1493* (2013.01); *B03D 1/24* (2013.01); *C02F 1/24* (2013.01); *C02F 1/40* (2013.01); *B01D 2221/04* (2013.01); *C02F 1/20* (2013.01); *C02F 1/30* (2013.01); *C02F 1/38* (2013.01); *C02F 2101/32* (2013.01); *C02F 2103/10* (2013.01); *C02F 2103/365* (2013.01); *C02F 2209/40* (2013.01)

(56) References Cited

FOREIGN PATENT DOCUMENTS

| | | |
|---|---|---|
| EP | 2263768 A1 | 12/2010 |
| FR | 2 108 594 A5 | 5/1972 |
| WO | 9965588 A1 | 12/1999 |
| WO | 2005079946 A1 | 9/2005 |
| WO | 2010080035 A1 | 7/2010 |
| WO | 2010146453 A1 | 12/2010 |
| WO | 2010146455 A1 | 12/2010 |

OTHER PUBLICATIONS

International Search Report and Written Opinion dated Feb. 28, 2013 for PCT No. PCT/US2012/066820 filed Nov. 28, 2012.
Norwegian Search Report dated Aug. 15, 2012 for Norwegian Patent Application No. 20120060 filed Jan. 19, 2012.

\* cited by examiner

APPARATUS AND METHOD FOR SEPARATION OF HYDROCARBONS FROM HYDROCARBON-CONTAINING PRODUCED WATER

This application is a 35 U.S.C. § 371 national stage application of PCT/US2012/066820 filed Nov. 28, 2012, entitled "Apparatus and Method for Separation of Hydrocarbons from Hydrocarbon-containing Produced Water," which claims priority to Norwegian Patent Application No. 20120060, filed on Jan. 19, 2012, both of which are herein incorporated by reference in their entirety for all purposes.

BACKGROUND

Globally the water production associated with the oil and gas production is more than three times higher than the oil production. This gives an average water fraction of about 75% of what is produced from the wells. The water percentage continues to increase. About ten years ago was it about 70%. The water fraction increases in proportion to the oil fields being older and decreases in proportion to better methods being developed to handle the reservoir and to new fields being introduced. Simultaneously the environmental conditions are being stricter and more complicated to meet. The challenges for the operators are increasing and the need of better, diminished and more cost effective technologies arises. The costs of water treatment participates in determining how high water content it will be profitable to produce. This will also depend on the oil price.

The purpose of the present invention is to provide a purification system for produced water with the main focus at oil installations onshore and offshore world-wide. Produced water coming up from the well with the well stream is separated from the oil and gas, and then purified and discharged to the sea or re-injected into the reservoir. Produced water is a mixture of formation water, residuals of production chemicals and re-injected water (on installations where this is carried out). The contents and composition of produced water vary from field to field and from well to well within the same field. In addition also the composition will vary over time in one and the same well. Each minute Norwegian oil platforms will treat about 400 $m^3$ water. A constantly more mature Norwegian shelf with less oil and more water has resulted in a strong increase in produced water. In 2007 about 200 millions $m^3$ produced water were treated on the Norwegian shelf. About 90 percent of this was discharged to the sea.

The Norwegian patent application, NO 20091364, relates to a process for separation of hydrocarbons from hydrocarbon-containing produced water, wherein in a first stage the hydrocarbon-containing produced water is supplied and mixed with a gas-containing component, whereupon the gas-and-hydrocarbon-containing produced water mixture is fed to an inlet tube in a tank, whereupon said mixture via a branch means is tangentially distributed along the tank wall via at least one tube with at least one outlet nozzle and at least one guide vane, mounted under each outlet nozzle, leading water over the next outlet nozzle, whereupon hydrocarbons and gas with adherent oil droplets will rise to at least one outlet from the tank and being discharged; and cleaned water is conveyed to an outlet in the bottom of the tank.

The process further comprises a second stage where a fraction of a gas-containing water mixture from the bottom outlet is recirculated via a stream and fed to an annulus chamber and further tangentially fed via at least one nozzle and at least one guide vane countercurrently or cocurrently to the descending water mixture from the first stage. The water mixture from first stage is fed to at least one separate stage, via at least one separating plate and at least one annulus chamber, and is further tangentially distributed via at least one nozzle and at least one guide vane. A descending water mixture may be fed over a layer of a packing material.

For large flotation tanks, above ca 50 $m^3$, the process and apparatus of NO20091364 have not performed optimally because the water stream from one distribution tube has not been properly mixed with the incoming water from the next distribution tube.

To obtain optimal mixing and consequently optimal cleaning of the produced water, the inventor has found that shrouds or annular walls arranged on the inside of the guide vane(s) 8.1, in an angle of 30° to 150° in relation to guide vanes 8 ensure a uniform flow in the outer part of the flotation tank. The water is directed along the entire guide vane 8.1 and thus, meets the incoming flow from next distribution tube. This solution has shown to be effective for better cleaning of the process water, and is not dependent on the size of the tank.

In the present invention the stages mentioned above can be carried out in the sequence which is considered as suitable for the purpose of the invention. Further the various stages can be repeated a number of times if it is considered suitable.

SUMMARY

The present invention describes apparatus for separation of hydrocarbons from hydrocarbon-containing produced water, where the apparatus comprises the following:
  a separator tank,
  at least one inlet tube,
  at least a branch means distributing the produced water stream, at least one distribution tube ending in an outlet nozzle and at least one guide vane,
  at least one shroud arranged wholly or partly along the at least one guide vane in an angle of 30° to 150° related to the at least one guide vane
  at least one outlet from the tank for purified water;
  at least one outlet for separated hydrocarbons.

Further the invention provides a method for separation of hydrocarbons from hydrocarbon-containing produced water, wherein the hydrocarbon-containing produced water is supplied and mixed with a gas-containing component, whereupon the gas-and-hydrocarbon-containing produced water mixture is fed to an inlet tube into the tank, whereupon said mixture via a branch means is tangentially distributed along the tank wall via at least one distribution tube with at least one outlet nozzle and at least one guide vane mounted under each outlet nozzle, a shroud leads the water over the next outlet nozzle, whereupon hydrocarbons and gas with adherent oil droplets will rise to at least one outlet from the tank and being discharged; and cleaned water is conveyed to an outlet in the bottom of the tank.

BRIEF DESCRIPTION OF THE DRAWINGS

Embodiment of the invention will now be described with reference to the following figures.

DETAILED DESCRIPTION

The purpose of the present invention can be achieved by the characteristic properties as shown in the following description of the invention.

Figure 1:
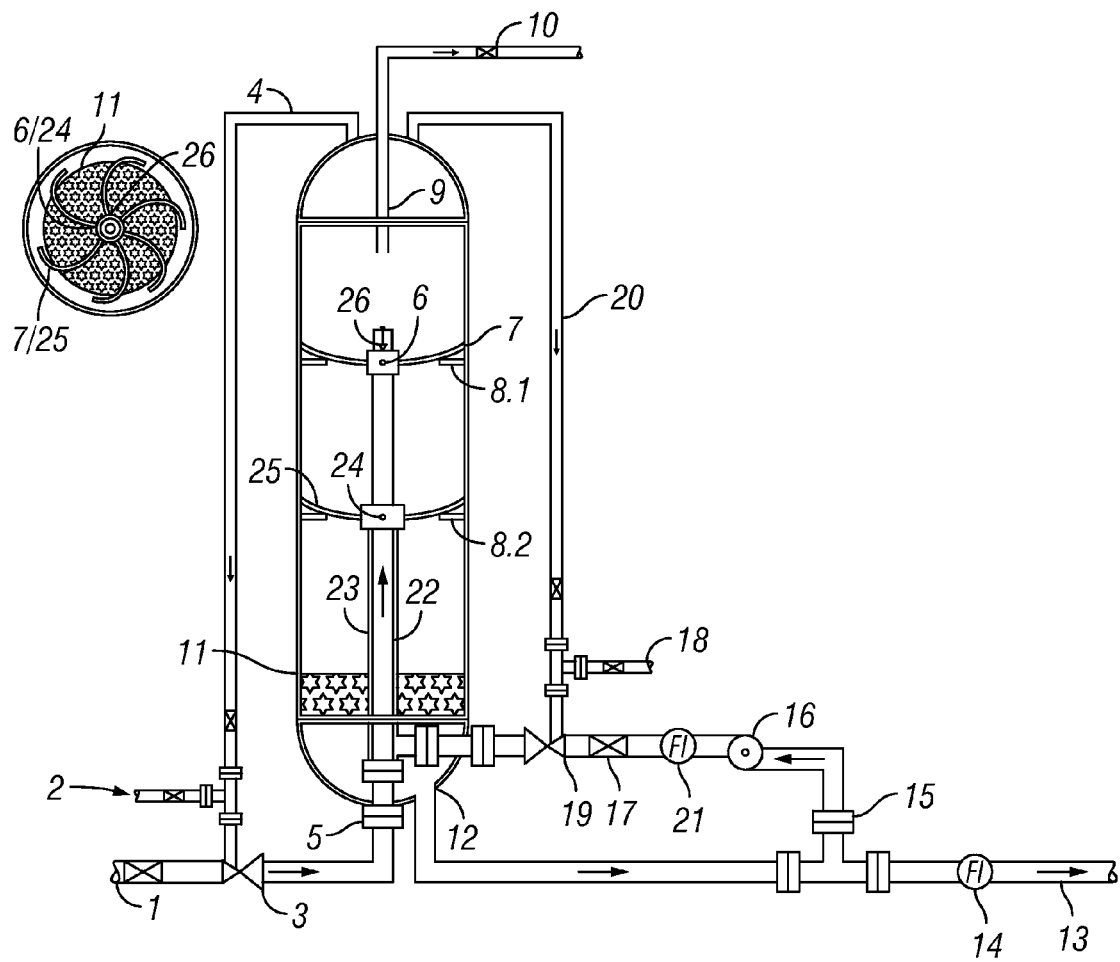
FIG. 1 shows a purification system for produced water.
Figure 5:
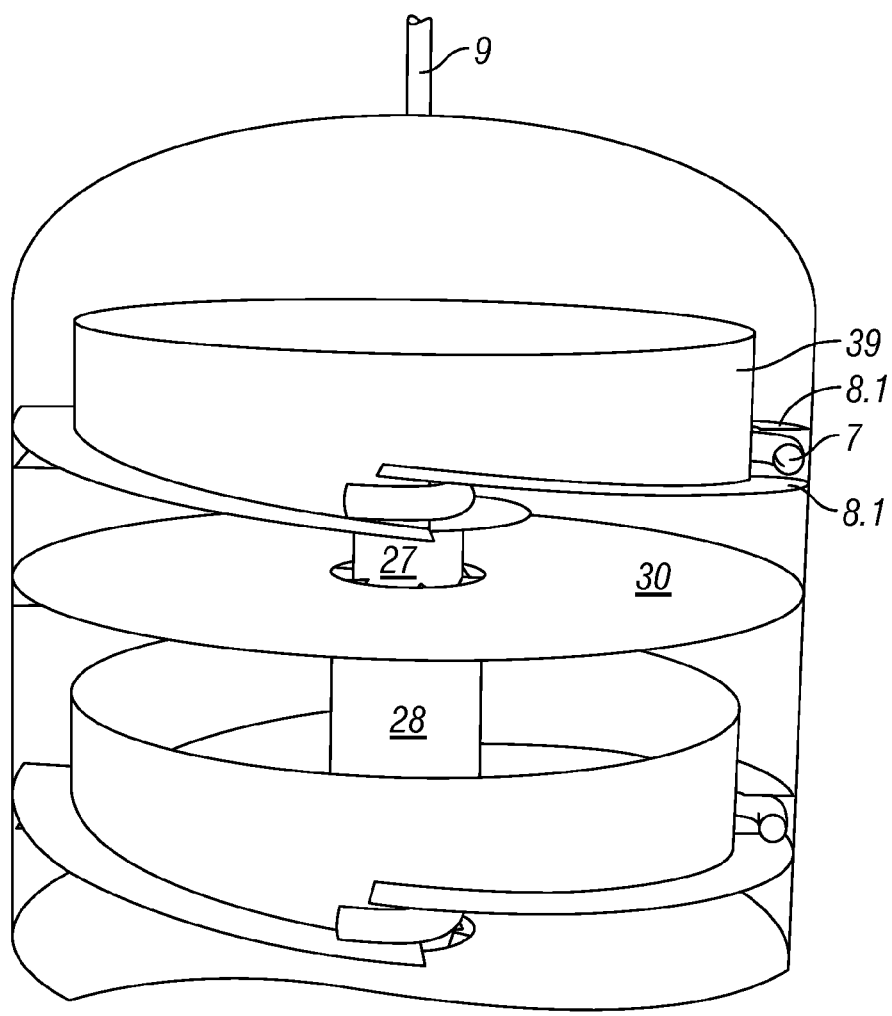
FIG. 5 shows two sections inside a separator tank with a shroud in the form of an inner annular wall.

In FIG. 1, produced water from oil/water separator or other purification equipment as hydrocyclones, degassing tank or similar can be fed in through inlet 1. This water is supplied with gas via gas injection point 2 and is mixed together with incoming water in a gas mixer 3. Alternatively the gas mixer 3 is replaced with an injector (ejector) having incoming water as driving force and which sucks gas through the tube 4 from the top of the tank. Typical gas amounts added or circulated is from 0.02 to 0.2 $Sm^3$ per $m^3$ water. This will vary with how much residue gas is present in the incoming water. This mixture of gas and oil-containing water is fed into an internal tube in the tank via the bottom 5. In the top of the internal tube there is a branch means 6 which distributes the water to one or more distribution tubes 25, 40 having outlet nozzles 7 for control of the velocity of gas/water mixture into the tank. These end tangentially along the tank wall. Because of the tangential ending of tubes/nozzles in the tank, a circulation is achieved in the tank which gives a mixing of water, gas and oil. This results in good contact between gas bubbles and oil droplets. To evade the water from the nozzles not to go directly downwardly in the tank, but be mixed with incoming water/gas, a guide vane 8 is mounted under each of the outlet nozzles, which are the inlets of the stream into the tank. This leads the water over the next outlet nozzle so that water wherein great gas bubbles have been released becomes mixed with incoming water for better mixing/contact between gas and the oil droplets. A shroud 39 is arranged on the inside of guide vane 8.1 with an angle of 30° to 150° in relation to the guide vane 8.1 to ensure that flow from one outlet nozzle 7 meets flow from the next outlet nozzle 7. This arrangement is shown in FIG. 5. In this embodiment the shroud 39 is fixed as an inner annular wall in a nearly vertical position (ca. 90°) in relation to guide vane 8.1. The shroud 39 may also be discontinuously arranged on the inside of guide vane 8.1.

Figure 2:
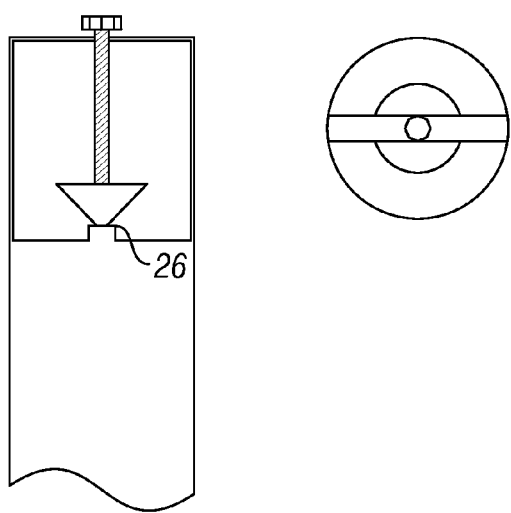
FIG. 2 shows a detail relating to top of nozzle.
Figure 3:
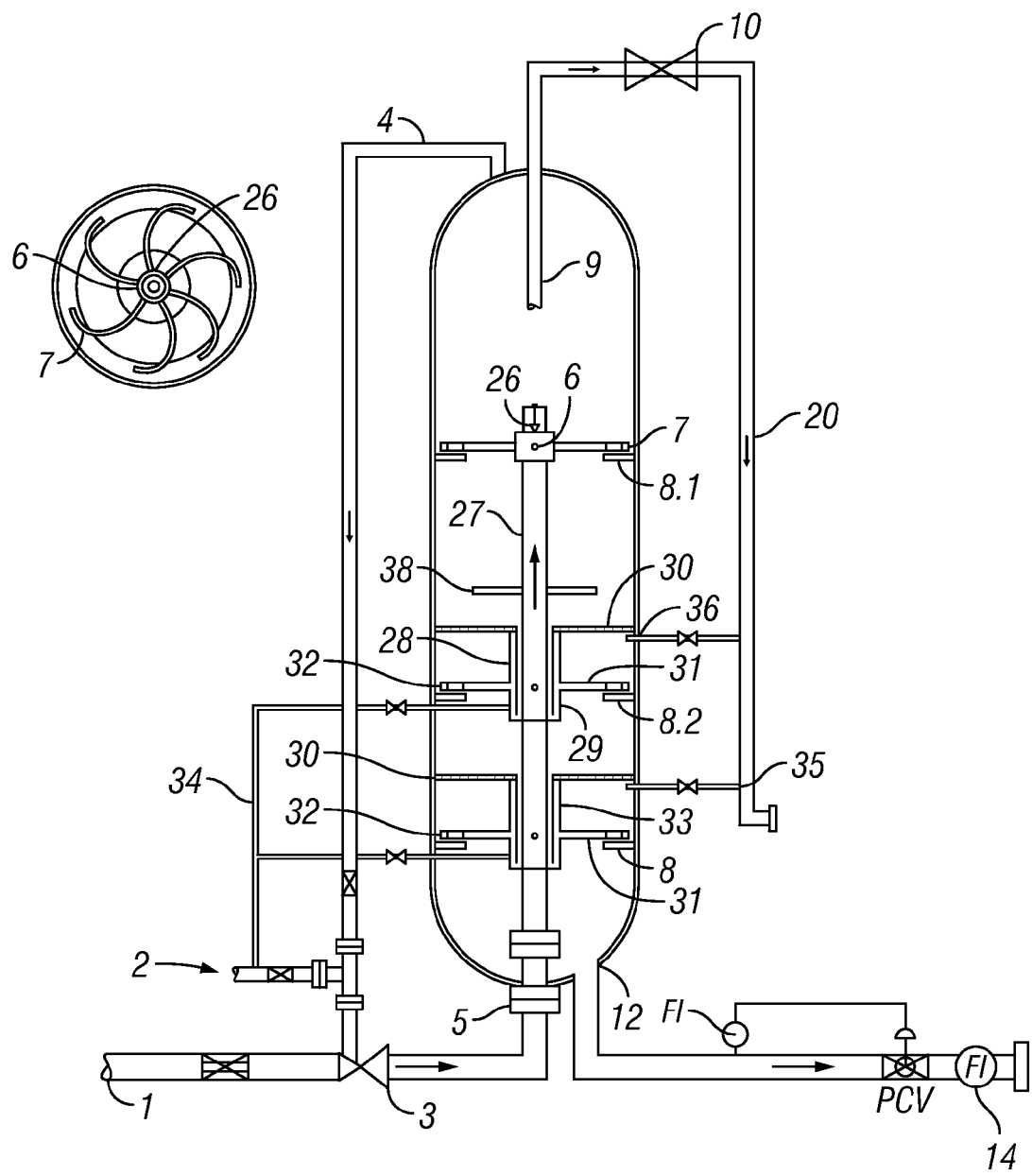
FIG. 3 shows a purification system with three stages where stage 37 shown in FIG. 4 is a separate stage which is repeated twice.

To achieve good mixing also in the centre of the tank an adjustable nozzle means 26 is mounted on the top of the inlet tube, see FIGS. 2 and 3. This spreads liquid/gas mixture from the centre and outwardly and mixes this with the liquid/gas mixture from the outlet nozzles 7. Gas with adherent oil droplets will rise to the surface of the liquid in the tank and be taken out together with some water in a submerged outlet 9 in the top of the tank. This discharge is controlled by means of a valve 10. The oil/water mixing ratio in this stream is dependent of the valve opening.

The water with gas bubbles having a minor ascending velocity than the water velocity downwardly in the tank will pass a "bed" of packing materials selected from the group comprising inter alia Raschig rings 11 or similar and to which gas bubbles with adhered oil is attached to, further growing together and therewith achieve a buoyancy which surpass the descending water velocity and float up to the surface. Pure (treated) water which is supplied from this "bed" will pass out in the outlet 12 in the bottom of the tank and further for emission 13 or optionally injection into the reservoir as pressure support. This amount is measured on the flow meter 14. A partial stream 15 from the water outlet from the tank will by means of a pump 16 be circulated back into the tank. The amount which is recirculated is controlled by means of a valve 17. Gas via an injection point 18 is supplied and is subsequently fed to this stream through a mixer 19 which mixes the gas into the water. Alternatively gas can be sucked from the top of the tank 20 by means of an injector which replaces the mixer 19. Typical gas amount will be 0.05 to 0.3 $Sm^3$ per $m^3$ water. Typical recirculation amount will be 30 to 70% of the maximum design rate for the tank. The amount of recirculation will be read from the flow meter 21. Outside the inner tube 22 is an external tube which in both ends is sealed against the inner tube 22. Thereby a chamber 23 is formed between these tubes into which the recirculation stream 15 enters. In the top of this chamber is a branch means 24 which distribute the water to one or more tubes 25, 40 having outlet nozzles 7 for control of the velocity of the gas/water mixture into the tank. These end tangentially along the tank wall. To evade that the water from the nozzles does not go directly downwardly in the tank, but is mixed with incoming water/gas, at least one guide vane 8.2 is mounted below each of the outlet nozzles. This leads the water over the next outlet nozzle so that water wherein large gas bubbles having been released are being mixed with the incoming water for better mixing/contact between gas and the oil droplets. Alternatively this stream can be distributed tangentially at any distance from the tubes 25 with underlying guide vane and an external vertical wall. Alternatively this stream can also be distributed vertically upwardly from the outlet of the tube. Alternatively the distributions mentioned above can be directed countercurrently to the described distribution relating to the outlet nozzles 7. In this regard water being separated from the upper nozzle system/mixing supplied with pure water/gas mixture and oil which might follow this water, will again be in contact with gas bubbles which become mixed into the water and therewith achieve a new contact zone for oil/gas which results in a better purification. Alternatively a fractional stream of incoming water can be fed through the same inlet. Water which is fed via the recirculation will follow the water phase out 12 in the bottom of the tank. To increase the size of the oil droplets in the incoming water chemicals can be added, for example flocculants, upstream from the unit.

For increased purification a number of tanks can be connected in series. Alternatively, each separate nozzle can have an injector which sucks gas via a tube 4 from top of the tank. This tube can be situated outside or inside in the tank.

Figure 4:
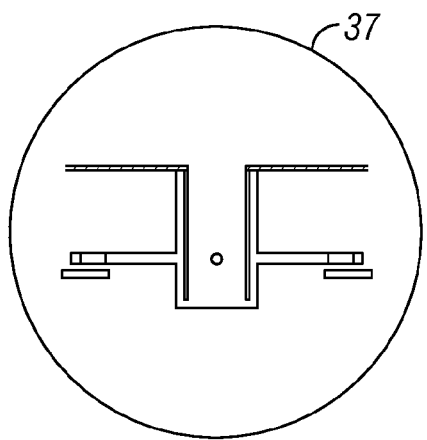
FIG. 4 shows a separate stage 37 which can be repeated as many times as desired.

Alternatively, the inlet tube can extend from the top of the tank and downwardly. Alternatively the water can be purified in a number of stages internally in the tank, in which water from the upper purification stage via nozzles 7 is passed via an annulus chamber 28 between the feed tube 27 and an externally located tube 29 and where the upper chamber is separated by means of plate 30, see FIG. 3. A detailed section view of the annulus chamber is shown in FIG. 4. One separator tank may include several sections separated by a plate and the annulus chamber shown in FIG. 4. Before the water enters the said annulus chamber a vortex breaker 38 is present which prevent water from the centre of the tank entering the annulus chamber. This is to avoid entrainment of oil from the top of the tank. The water is fed therefrom via the branch means 31 which distributes the water to one or more tubes having outlet nozzles 32 for control of the velocity of gas/water mixture into a novel chamber. These nozzles end tangentially along the tank wall. Alternatively gas can be supplied to this stream via gas addition 34. A typical gas is nitrogen, hydrocarbon gas (fuel gas), $CO_2$, but are not restricted to these. Oil and gas which is separated in this chamber is removed via reject outlet 36 and is combined with reject outlets 20 and 35. Alternatively a number of separate stages as previously described can be installed below each other where in these stages have the similar function.

FIG. 5 as described above shows a view of two sections inside a separator tank. The inner annular wall/shroud 39 is fixed on the inside of the guide vanes 8.1, directed upwards. In this embodiment the annular wall is arranged almost 90° on the guide vanes 8.1. The height of the shroud 39 can be almost any height, but generally it is preferred that it corresponds to the width of the guide vane 8.1. The inlet tube 27 and the annulus chamber 28 are shown in the figure.

Figure 6:
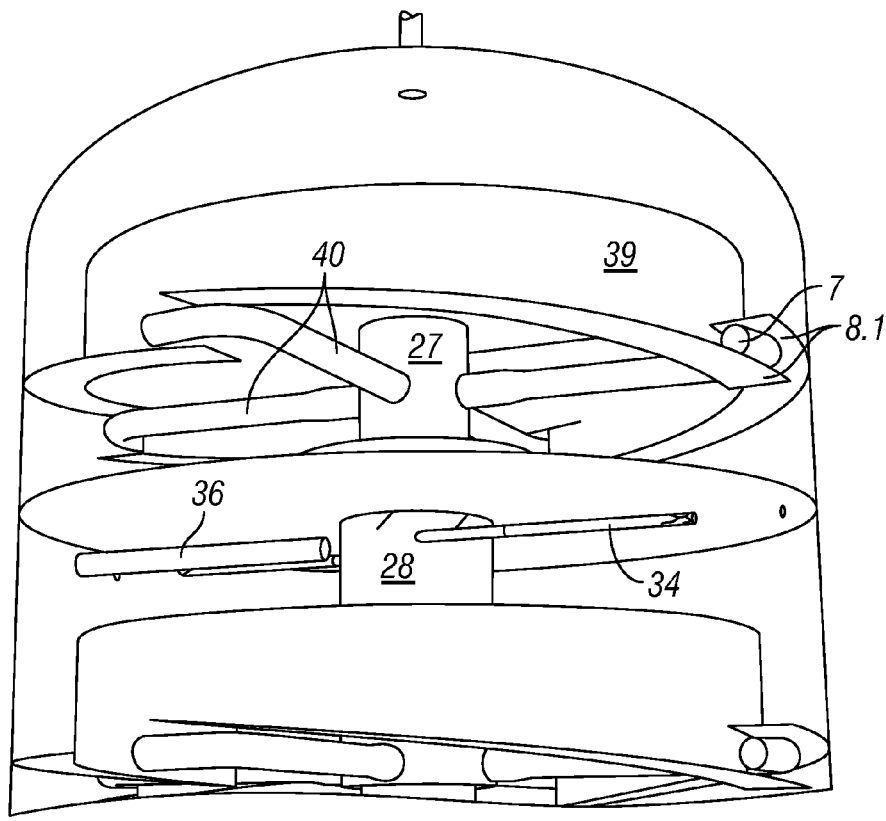
FIG. 6 shows the same sections inside a separator tank as in FIG. 5, seen from below.

FIG. 6 shows the same embodiment as FIG. 5, but from a different angle. Here the guide vanes 8.1 can be seen from below. Gas can be injected through tube 34 to the annulus chamber. Oil and gas which are separated in this chamber are removed via reject outlet 36.

The present invention provides a solution which renders the installation more compact and more effective. Prior art within this field uses a number of purification stages in series. This present solution has a number of purification stages within the same tank. It shall further be specified that the present invention can be carried out with the purification stages mentioned above in the sequence and in the number which is considered suitable. This will reduce the costs, reduce necessary required space and therefore be opportune for more customers. Because of its design will it be simpler to build (fabricate) and also easier to be adapted into existing installations than tanks with for example external tangential inlet.

Embodiments of the present process and apparatus may comprise the following:

Process and apparatus for separation of oil/hydrocarbons in liquid state or gaseous state from produced water in oil production, separation of other liquids/gases with specific weight difference and which are not dissolved in each other, comprising:

a. A pressure tank with different height/diameter ratio dependent on what is to be separated.

b. Where the inlet stream consisting of what is to be separated, is fed into a inlet tube of the tank with the possibility of addition of gas via recirculating from the top of the tank via an ejector (eductor) or additional external gas as for example nitrogen, carbon dioxide, hydrocarbon gas which for example is separated from production separators, but which are not restricted to these.

c. A distribution means in the top of inlet tube above described in item b. and which distribute the feed into one or more distribution tubes which end tangentially along the tank wall and at least one guide vane below these extending nearly horizontally, slightly upwards. An annular wall or shrouds are fixed to the guide vanes on the inside directed upwards in an angle of between 30° and 150° entirely or partly along the lengths of the guide vanes. This arrangement ensures that the stream from at least one distribution tube is directed over the next distribution tube to create a spin (circulation) in the tank and a homogenous stream which gives good mixing of gas/liquid in this portion of the tank.

d. An adjustable nozzle means mounted on the top of the inlet tube described in item b. above. This means spreads the liquid/gas mixture from the centre and outwardly in the tank and mixes with the liquid/gas mixture from the nozzle tube described in item c.

e. A tube outside the feed tube described in item c and which is sealed in both ends against the feed tube described in item c and forms an annulus chamber where a recirculated stream from the purified water outlet can be recirculated together with gas added into a mixer or with recirculated gas from the top of the tank via an ejector. Alternatively a portion of the feed stream can be fed into the annulus tube.

f. Where the described annulus tube has a distribution means as described in item c, but placed lower than the distribution tube described in c where the feed stream can be tangentially distributed in any distance from the tube towards the tank wall directionally controlled cocurrently or countercurrently to the distribution stream described in item c. The guide vane has an outer vertical wall which is 2 to 10 times higher in height than the distribution tube by distribution nearer a tank wall. Alternatively the distribution tubes can be directed horizontally upwards.

g. Where purified liquid outlet is in the bottom of the tank.

h. Where downwardly flowing liquid stream passes a "bed" of gas coalescent material (packing material) where small gas bubbles with adherent droplets/particles are build together to large ones and are given buoyancy to rise to the surface.

i. Where gas and oil which has been separated are removed from the top of the tank via a submerged tube at a level of between 5 and 20% of the tank height from the top of the tank where the removed amount is regulated by means of a valve.

j. A gas "pad" in the top of the tank is formed due to the tube described in item i, which is a buffer for recirculation of gas.

k. Where the pressure in the tank is controlled by means of a valve in the outlet tube.

Example 1

Figure 7:
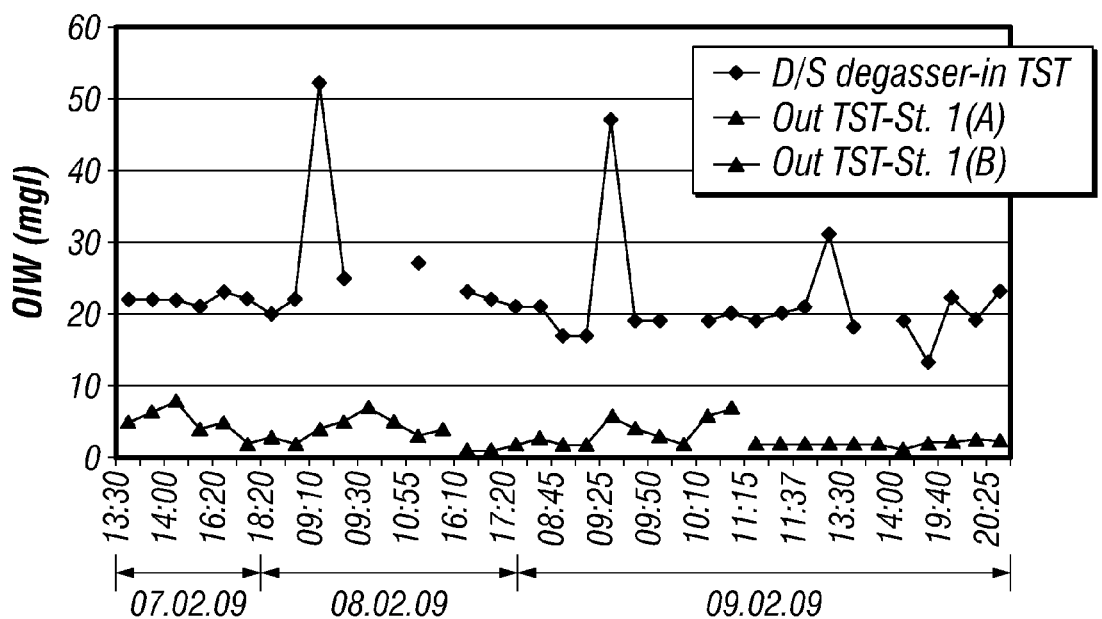
FIG. 7: Diagram showing the effect of a process of separation.

Example 1 shows purification of water from a degassing tank where the top curves show hydrocarbon content in produced water which is fed into the tank. FIG. 7 shows the effect of the process for separation of hydrocarbons from hydrocarbon-containing produced water where the water has been supplied with a gas-containing component and where the gas- and hydrocarbon-containing produced water mixture has been fed to an inlet tube in the centre of a tank. Further, the said mixture has been tangentially distributed via at least one nozzle and at least one guide vane, and the separated hydrocarbons has been conveyed to an outlet from the tank and purified water has been conveyed to an outlet from the tank. The curves at the bottom show the remaining content of hydrocarbons conveyed to an outlet for purified water.

It is important to notice that further purification stages can be affected in relation to the various stages and the embodiments as described in the foregoing. When preferred embodiments of the present invention have been described, it will for the person skilled in the art be evident that other embodiments which incorporate the concepts can be used. These and example illustrated in the foregoing are considered as mere example and the factual scope of the invention shall be determined from the following patent claims.

The invention claimed is:

1. An apparatus for separation of hydrocarbons from hydrocarbon-containing produced water, comprising;
    a separator tank;
    an inlet tube;
    a branch means for distribution of the produced water
    a distribution tube extending from the branch means and ending in a first outlet nozzle;
    a guide vane mounted under the outlet nozzle to lead water over to a next outlet nozzle;
    an outlet in the bottom of the tank for cleaned water;
    an outlet for removal of rising gas with adherent oil droplets; and
    a shroud fixed entirely or partly along the inside of the guide vane in an angle of 30° to 150° related to the guide vane.

2. The apparatus of claim 1, wherein the shroud extends upwards from the guide vane in a distance corresponding to the width of the vane.

3. The apparatus of claim 1, wherein the shroud is arranged on the inside of the guide vane in an angle of 50° to 120°.

4. The apparatus of claim 1, wherein the shroud comprises an annular wall fixed to the guide vane.

5. The apparatus of claim 1, wherein a plate separates the separator tank into two chambers.

6. The apparatus of claim 5, wherein the apparatus further comprises a vortex breaker, and wherein a chamber encircles the inlet tube and comprises a branch means.

7. A method for separation of hydrocarbons from hydrocarbon-containing produced water in a pressure tank, comprising:
    supplying the hydrocarbon-containing produced water and mixing the hydrocarbon-containing produced water with a gas-containing component;
    feeding the gas-and-hydrocarbon-containing produced water mixture to an inlet tube in the centre of a tank;
    distributing said mixture via a branch means tangentially along the tank wall via distribution tubes, each with a first outlet nozzle;
    leading said mixture over to a next outlet nozzle by a guide vane mounted under each outlet nozzle and a shroud fixed to the guide vane in an angle of 30° to 150°;
    allowing hydrocarbons and gas with adherent oil droplets to rise to an outlet from the tank;
    discharging the hydrocarbons and gas with adherent oil droplets from said tank through the outlet; and
    conveying cleaned water to an outlet in the bottom of the tank.

8. The method of claim 7, further comprising:
    recirculating at least a portion of the cleaned water into the tank.

9. The method of claim 8, wherein the recirculating comprises:
    mixing the at least a portion of cleaned water with another gas-containing component;
    feeding the gas-and-at least a portion of clean water mixture to an annulus chamber that encircles the inlet tube; and
    distributing the gas-and-at least portion of clean water mixture via a second branch means tangentially along the tank wall.

10. The method of claim 7, further comprising:
    adjusting a ratio within the gas-and-hydrocarbon-containing produced water mixture feed to the inlet tube.

11. The method of claim 7, further comprising:
    allowing the cleaned water to pass through packing materials within the tank;
    discharging the cleaned water from the bottom of the tank.

12. An apparatus for separation of hydrocarbons from a hydrocarbon-containing produced water stream mixed with a gas-containing component, comprising;
    a separator tank;
    an inlet tube to receive the produced water stream in the tank;
    a distribution tube with an outlet nozzle to distribute the produced water stream from the inlet tube;
    a guide vane mounted under the outlet nozzle to receive and lead the produced water stream over to a next outlet nozzle;
    a shroud positioned on an interior surface of the guide vane;
    an outlet at the bottom of the tank to convey cleaned water out of the tank; and
    an outlet at the top of the tank to convey rising gas with adherent oil droplets from the tank.

13. The apparatus of claim 12, wherein the shroud is angled between about 30° to 150° with respect to an axis of the tank.

14. The apparatus of claim 12, further comprising:
    an annulus chamber formed about the inlet tube to receive a gas-and-clean water mixture in the tank; and
    a second distribution tube to distribute the gas-and-clean water mixture from the annulus chamber.

15. The apparatus of claim 12, wherein the outlet nozzle is positioned tangentially along a tank wall.

16. The apparatus of claim 12, further comprising an adjustable nozzle means connected to the inlet tube.

17. The apparatus of claim 12, further comprising packing materials positioned within the tank to filter cleaned water at the bottom of the tank.

* * * * *